July 26, 1966

A. THEVENET 3,262,583

DEVICES FOR FIXING AND INTRODUCING BARS INTO THE SPINDLES OF MACHINE TOOLS

Filed Dec. 17, 1963

INVENTOR
Albert Thevenet
BY
ATTORNEYS

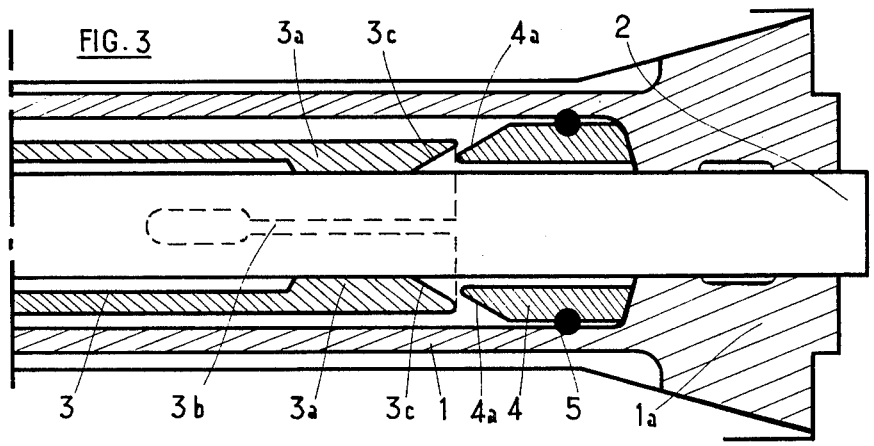
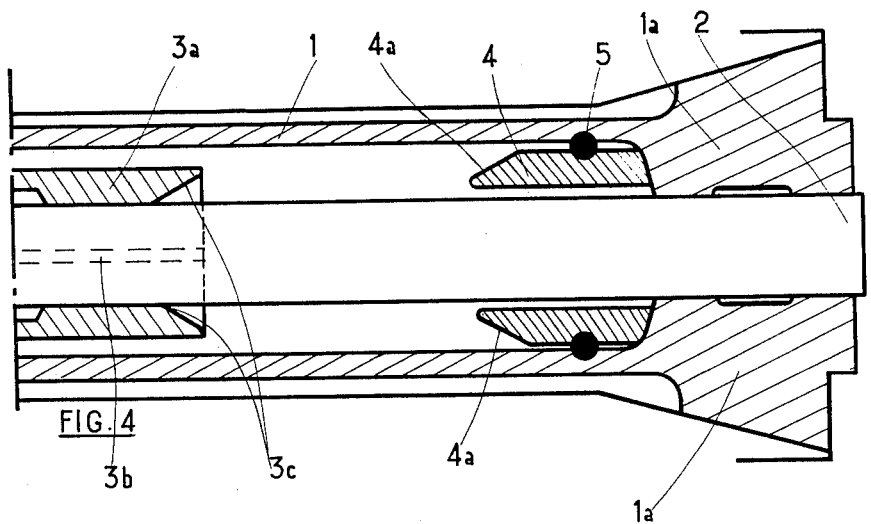

July 26, 1966 A. THEVENET 3,262,583
DEVICES FOR FIXING AND INTRODUCING BARS
INTO THE SPINDLES OF MACHINE TOOLS
Filed Dec. 17, 1963 4 Sheets-Sheet 4
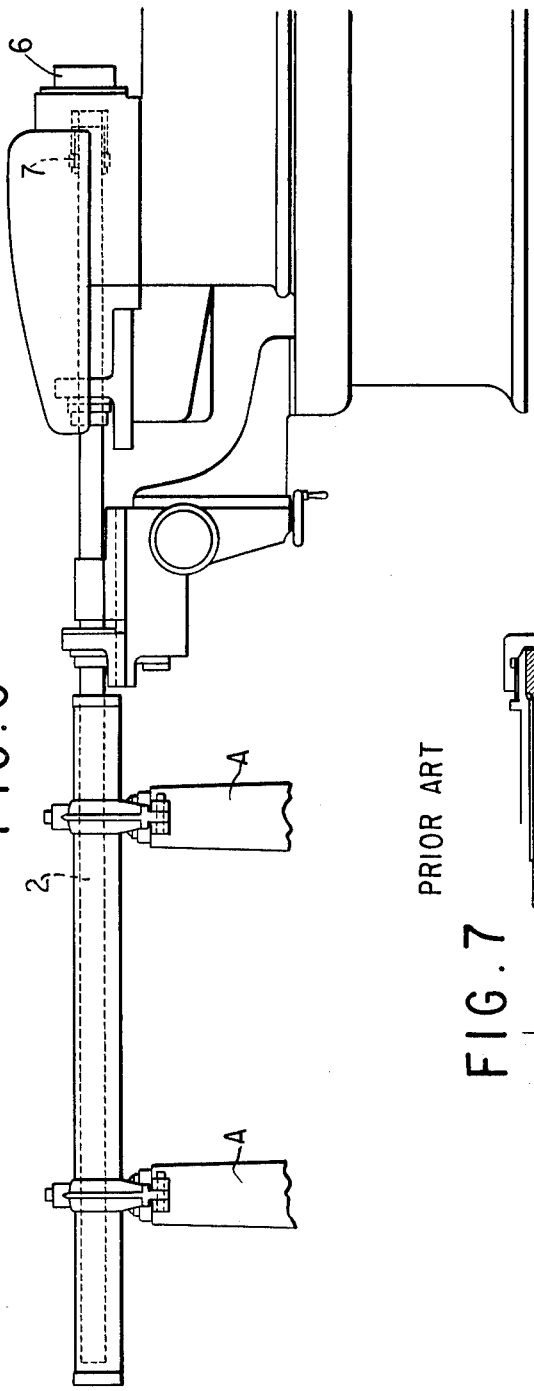
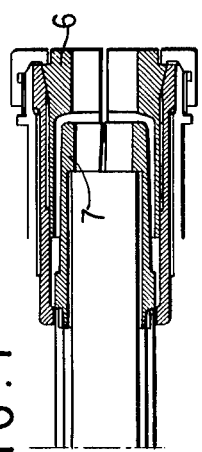
INVENTOR
ALBERT THEVENET
BY
ATTORNEYS

United States Patent Office 3,262,583
Patented July 26, 1966

3,262,583
DEVICES FOR FIXING AND INTRODUCING BARS INTO THE SPINDLES OF MACHINE TOOLS
Albert Thevenet, Mulhouse, Haut-Rhin, France, assignor to Manufacture de Machines du Haut-Rhin, a company of France
Filed Dec. 17, 1963, Ser. No. 331,171
Claims priority, application France, Dec. 21, 1962, 919,530
2 Claims. (Cl. 214—1.1)

This invention relates to devices for fixing and introducing bars into the spindles of machine tools, particularly, but not exclusively, into the spindles of single-spindle automatic lathes, such as described for example in British Patent No. 812,857.

According to the present invention, there is provided a device for fixing and introducing bars into spindles of machine tools, comprising an advancing clamp provided with jaws; a holding clamp; an auxiliary element inside the holding clamp, said auxiliary element co-operating, when the whole of a bar has been used up, with said advancing clamp to open said advancing clamp by oblique sliding movement of said jaws on said auxiliary element; and means for automatically stopping said machine after said opening of said auxiliary clamp.

In the accompanying drawings:

FIGURES 3, 4 and 5 are similar views of a device according to the present invention.

Figure 1:
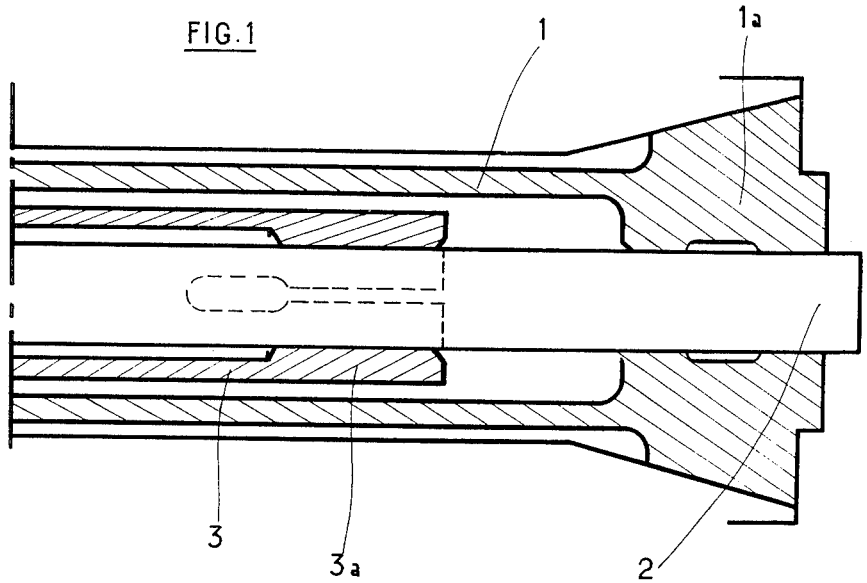
FIGURES 1 and 2 are axial sections of a known device.
Figure 5:
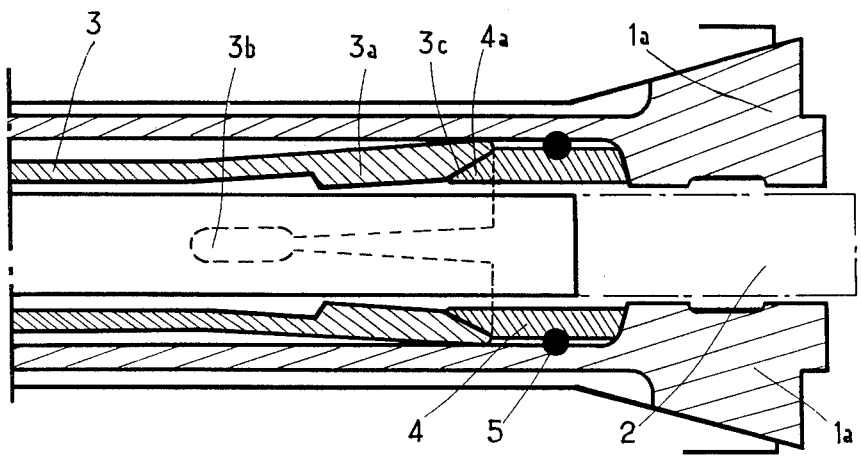

FIGS. 6 and 7 are views corresponding to FIGS. 1 and 8 of the British Patent No. 812,857, which illustrate the relation of the invention of FIGS. 3, 4 and 5 to machine tools to which this invention applies.

Figure 2:
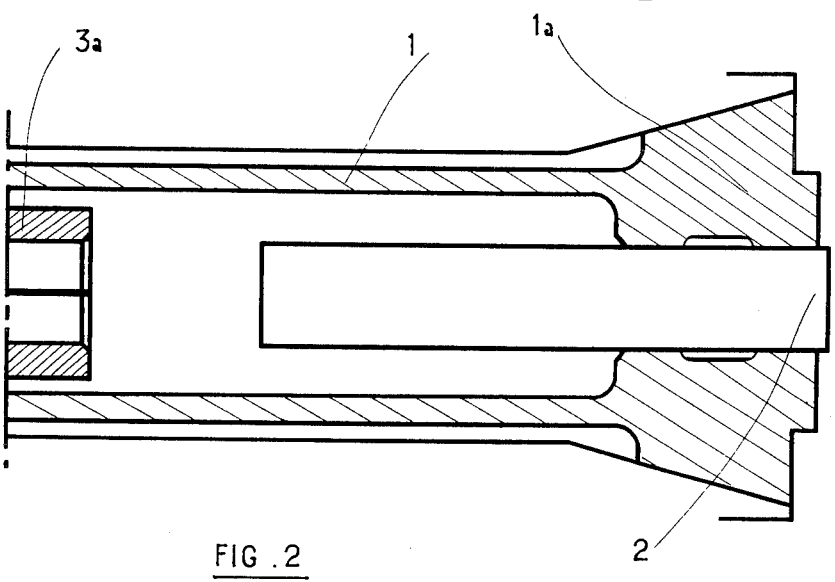

In known machines using bars passing through spindles, for example in single-spindle automatic lathes, the advance of the bars is effected by means of a feed clamp co-operating with a holding clamp. A conventional device of this type is illustrated in FIGURES 1 and 2, which show the device at two operational stages. At the end of an operational cycle (FIGURE 1), a holding clamp 1 is a tight fit on the bar 2 and a feed clamp 3, located within the holding clamp 1, is remote from the jaws of the latter, while the jaws 3a of the feed clamp 3 engage on the bar 2. To advance the bar 2, the holding clamp 1 opens and the feed clamp 3 draws the bar forwards; the holding clamp 1 closes on the bar, while the feed clamp 3 slides backwards on the bar into its initial position, these various movements being produced by suitable mechanical, electrical or hydraulic systems, examples of which are illustrated in said British patent. Thus, the bar 2 is advanced over a pre-determined distance and a new operating cycle commences.

When the bar has been practically used up in the course of the operating cycles, the jaws 3a of the feed clamp 3 release the bar 2 and close against each other during the return movement of the clamp 3 towards its initial position after a final advancing movement of the bar 2 (FIGURE 2). At this instant, a compensating spring causes the clamp 3 to have an additional backwards movement which stops the machine to allow a new bar to be placed in position by the operator.

The positioning of a new bar in the feed clamp is generally effected either by hammering or by means of a special forcing device mounted on the machine. In any case, the introduction of the bar requires a considerable force in the axial direction which has a detrimental effect on the spindle support members, rings, bearings, etc.

The invention relates to an improved bar-advancing and fixing device on spindle-equipped machines, comprising essentially an advancing clamp and a holding clamp operating in known manner and an auxiliary element associated with the holding clamp and capable of co-operating with the advancing clamp in such a manner that when the machine stops for receiving a new bar, the advancing clamp is open and the new bar can be introduced into said clamp without forcing.

FIGURES 3, 4 and 5 illustrate a device according to the present invention, an advancing clamp being shown in its extreme forward position in FIGURE 3, in its maximum retracted position in FIGURE 4 and in its open position for receiving a fresh bar in FIGURE 5.

The device according to the invention comprises a holding clamp 1 with jaws 1a capable of clamping a bar 2. A generally cylindrical advancing clamp 3 has two jaws 3a capable of closing on the bar 2, these jaws being separated by an axial slip 3b. The jaws 3a terminate in truncated chamfers 3c facing inwards. An auxiliary sleeve element 4, with an internal diameter greater than that of the bar 2 is mounted on the internal face of the holding clamp 1, close to the jaws 1a, for example by means of a joint 5. This sleeve terminates on the side of the advancing clamp 3 in a truncated chamfer 4a facing outwards. The edge 4a is substantially parallel to the edges 3c in their normal operating position.

In normal operation, the device according to the invention functions in a manner analogous to that of a conventional device comprising an advancing and a holding clamp, the element 4 not participating in the operation in any manner. To advance the bar 2, the advancing clamp 3 advances from its rear position (FIGURE 4), drawing the bar 2 forward, the holding clamp 1 being open. Once this advance has been completed, the holding clamp 1 closes on the bar 2 and the advancing clamp 3 retreats, its jaws 3a sliding on the bar.

When almost all of bar 2 has been used up, the clamp 3, in its return movement following a final advance of the bar 2, releases the bar. A compensating spring then imparts an additional backward movement to clamp 3 which stops the machine as in conventional. A supplementary advancing movement which may be produced by any appropriate mechanical, electrical or hydraulic system, integrated or not into the machine cycle brings forward the advancing clamp 3. During this last movement, the clamp moves beyond the position of the normal maximum advance so that the truncated chamfers 3c of the advancing clamp, co-operating with the truncated chamfers 4a facing in direction opposite to the fixed element 4 bring about the opening of the slits 3b, that is to say, the opening of clamp 3. The supplementary advancing movement stops when the advancing clamp is thus in open position (FIGURE 5), the adjustment of this opening being obviously dependent of the magnitude of the distance by which the position of normal maximum advance has been exceeded by the advancing clamp 3.

Thus, a fresh bar can be introduced into clamp 3 without forcing, the start of the new cycle with the fresh bar being effected by replacing the clamp 3 into its normal position, the bar being blocked in position by the holding clamp 1, either by the device provided on the machine or by other appropriate means.

The supplementary advancing movement can be produced by any appropriate mechanical, electrical or hydraulic system, integrated or not into the machine cycle.

The opening stress of clamp 3 by co-operation with element 4 is also an axial stress, acting on the spindle support elements, but that this stress is very small.

FIGS. 6 and 7 taken from the British Patent No. 812,857 show the relation of the clamps 1 and 3 of FIGS. 3, 4 and 5 to a complete single spindle automatic lathe.

In FIGS. 6 and 7 the clamp 6 corresponds to the clamp 1 of FIGS. 3, 4 and 5 and the clamp 7 corresponds to the clamp 3 of FIGS. 3, 4 and 5. The bar 2 being advanced into the lathe is supported on supports A as described in said British Patent No. 812,857.

What is claimed is:

1. A device for fixing and introducing bars into spindles of machine tools comprising a holding clamp provided with jaws capable of clamping a bar; a reciprocating advancing feed clamp located within the holding clamp and provided with jaws which cooperate with the holding clamp to advance the bars and an auxiliary element having an outwardly inclined surface inside the holding clamp close to the jaws thereof, said auxiliary element cooperating with said advancing clamp to open the jaws thereof by oblique sliding movement of said jaws on said auxiliary element when said advancing clamp has been moved forward beyond its normal advance position after the bar has been used up.

2. A device for fixing and introducing bars into spindles of machine tools comprising a holding clamp provided with jaws capable of clamping a bar; a reciprocating advancing feed clamp within the holding clamp and provided with jaws having inwardly facing chamfers at their extremities; an auxiliary sleeve inside the holding clamp close to the jaws thereof having a diameter such that a bar can be received therein and having an outwardly facing truncated chamfer slidably engageable with said inwardly facing chamfers of the advancing clamp when the said clamp is moved forward beyond its normal advance position whereby the jaws of advancing clamps are opened.

References Cited by the Examiner

UNITED STATES PATENTS

| | | | |
|---|---|---|---|
| 622,760 | 4/1899 | Davenport | 82—920 X |
| 1,212,605 | 1/1917 | Brightman | 226—151 |
| 2,261,378 | 11/1941 | Jelinek | 226—151 |
| 2,669,345 | 2/1954 | Brown | 82—920 X |
| 2,976,076 | 3/1961 | Farley | 294—86.32 X |

FOREIGN PATENTS 891,672   12/1943   France.

MARVIN A. CHAMPION, *Primary Examiner.*

DAVID J. WILLIAMOWSKY, *Examiner.*